United States Patent
Altenhöner

(10) Patent No.: US 7,900,664 B2
(45) Date of Patent: Mar. 8, 2011

(54) METHOD OF SETTING MACHINING UNITS HAVING A RESPECTIVE CUTTING TOOL

(75) Inventor: Horst Altenhöner, Herford (DE)

(73) Assignee: Prewi, Schneidwerkzeuge GmbH, Herford (DE)

(*) Notice: Subject to any disclaimer, the term of this patent is extended or adjusted under 35 U.S.C. 154(b) by 343 days.

(21) Appl. No.: 11/940,715

(22) Filed: Nov. 15, 2007

(65) Prior Publication Data

US 2008/0115856 A1   May 22, 2008

(30) Foreign Application Priority Data

Nov. 17, 2006 (DE) .................. 10 2006 054 275

(51) Int. Cl.
*B23Q 15/00* (2006.01)
(52) U.S. Cl. .......... 144/356; 144/382; 144/394; 144/404
(58) Field of Classification Search ............ 144/382, 144/356, 357, 392, 394, 402, 404; 600/109
See application file for complete search history.

(56) References Cited

U.S. PATENT DOCUMENTS

| | | | |
|---|---|---|---|
| 6,952,231 B1* | 10/2005 | Paavola et al. | 348/335 |
| 7,155,316 B2* | 12/2006 | Sutherland et al. | 700/248 |
| 2002/0054800 A1 | 5/2002 | Hwu et al. | |
| 2004/0111183 A1* | 6/2004 | Sutherland et al. | 700/245 |

FOREIGN PATENT DOCUMENTS

| | | |
|---|---|---|
| CH | 692 309 | 4/2002 |
| DE | 297 09 877 | 10/1997 |
| DE | 198 24 219 | 12/1999 |
| EP | 1 930 120 | 6/2008 |

* cited by examiner

*Primary Examiner* — Shelley Self
(74) *Attorney, Agent, or Firm* — Barnes & Thornburg LLP

(57) ABSTRACT

The settings of machining units of a machine are effected one after the other using a camera which transmits at least the position of the tool to a display unit. At least an end section of a workpiece to be machined is displayed with the actual position of the cutting tool, which can at least be preset. The machine contains a holding fixtures) for the camera. The camera) is inserted into a holder which is put onto the holding fixture.

7 Claims, 1 Drawing Sheet

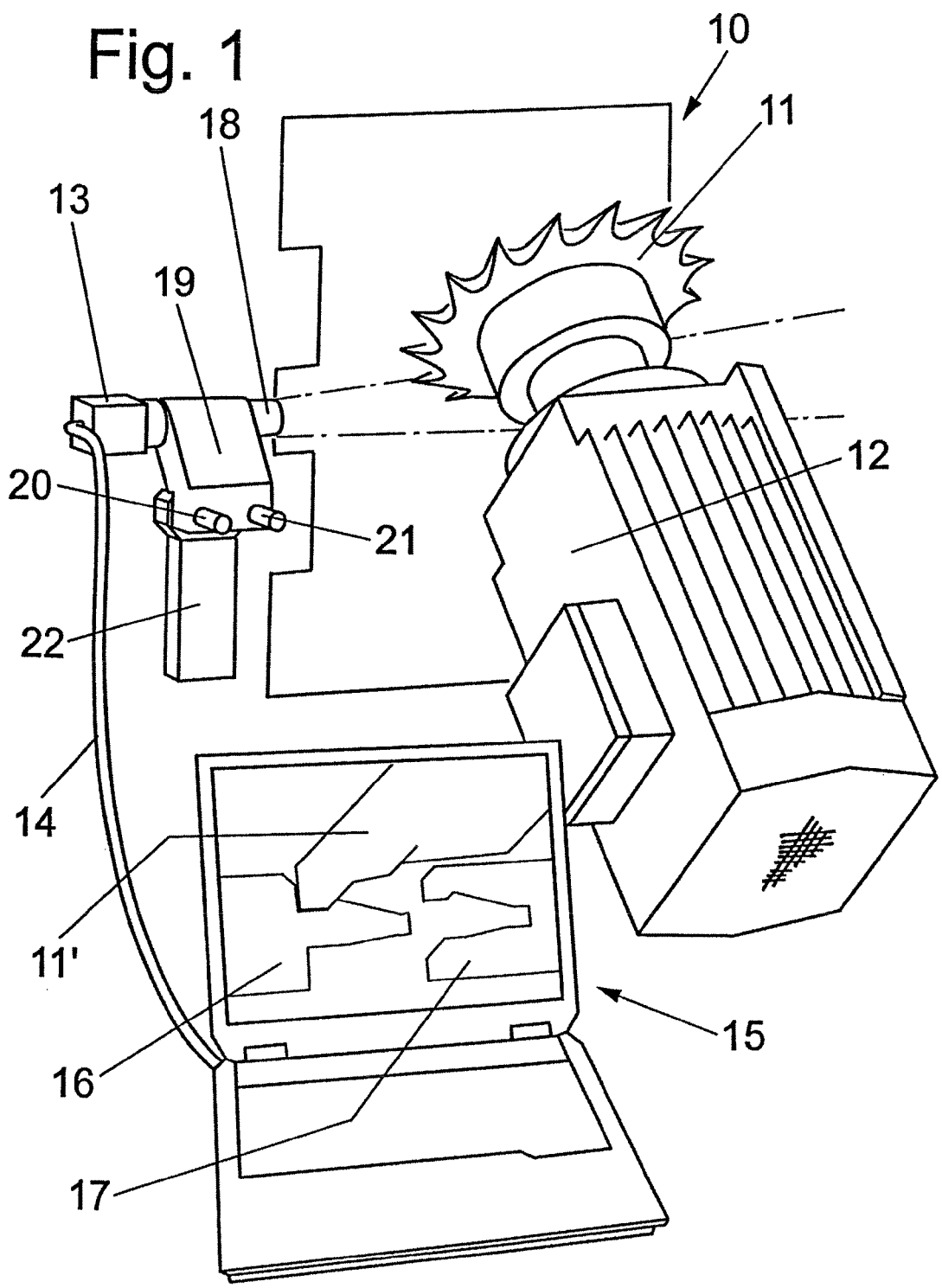

METHOD OF SETTING MACHINING UNITS HAVING A RESPECTIVE CUTTING TOOL

BACKGROUND AND SUMMARY OF THE DISCLOSURE

The invention relates to a method for setting machining units, having a respective cutting tool, for a machine designed to machine workpieces made of wood or wood substitute materials in the region of the longitudinal and/or transverse edges, in which method the workpieces can be transported in a continuous operation through the machining units arranged in a row.

Floorboards are may be machined according to the method described above, but other profiles are also suitable. In order to obtain the cross sections, the cutting tools of the machining units must be set relative to one another in accordance with the cross sections. As a result of these cross sections, a machine working must have a relatively large number of machining units, correspondingly designed tools also being used according to the cross section of the workpiece. Since the cross sections are often configured in such a way that at least the longitudinal edge regions of two workpieces or panels engage one inside the other in a correspondingly accurately fitting manner, an extremely precise setting of the machining units is necessary. These settings were hitherto effected for each machining unit by cutting operations in the form of test runs which were carried out one after the other. The setting of all the machining units is consequently quite time-consuming.

DE 198 24 219 A shows a CNC woodworking machine, on the machine table of which differently shaped clamping elements are placed. A workpiece blank fixed on the machine table by said clamping elements is machined in a program-controlled manner by a routing tool or another tool. Mounted above the machine table is a video camera which cinematographically records the machine table together with the clamping elements resting thereon. The cinematographic images can be reproduced on a monitor. The monitor shows the clamping elements and displays the variation in these clamping elements. A CNC control device delivers control signals to this machine for machining the workpiece blank. Furthermore, this program delivers corrected and adapted graphics of the workpiece via a computer. The video camera in conjunction with the monitor shows only the variation in the position of the clamping elements.

The object of the invention is to provide a method for setting the machining units, having a respective cutting tool, wherein the time required is substantially reduced. The possible running time is correspondingly increased, as a result of which such a machine working according to the method according to the invention can be operated more efficiently. The object of the invention is also to design a machine equipped with the machining units in such a way that the time required for setting the machining units can be substantially reduced using simple, generally known devices.

The object which relates to the method is achieved by a camera, wherein the respective position at least of the cutting tool of the machining unit to be set is recorded and transmitted graphically to a display unit, and that the display unit reproduces the cross section of at least one workpiece in the final state, such that the display unit can be used as a gauge for positioning the cutting tool.

The method according to the invention could be designated as an optical setting-up system, since the camera constitutes an essential functional component. The display unit receives from a drawing file the necessary data for representing the cross section or cross sections. As a result, they can be retrieved at any time. The setting of the tool or of the machining unit could be regarded as a superimposed operation which is seen by the combination of the display unit with the associated drawing file and the transmission of the image recorded by the camera. The position of the workpiece to be machined or of the cutting profiling to be carried out on this workpiece relative to the tool or the machining unit then appears on the display unit. This operation for setting the machining unit could at least be regarded as a presetting, such that possibly only slight corrections have to be made.

Through the use of the method according to the invention, it may be assumed that the time required for setting the machining unit is reduced to a fraction of the time required hitherto. As a result, the availability of the machine or its running time is markedly increased, such that a very considerable increase in productivity is provided for. The method according to the invention could be regarded not only as an optical setting-up system but also as a measuring method, in which the position of the cutting tool relative to the cross section displayed on the display unit can be recognized.

In a further configuration, provision is made for the camera to be a digital camera and for the display unit to be designed as a notebook computer. The camera and the display unit are connected to one another via a cable transmitting signals. These devices are commercially available devices which can be obtained from specialized dealers or via specialized markets. According to the invention, the display unit or the notebook is used for the setting of the machining unit or of the tool.

Furthermore, provision is made for the camera to be capable of being secured to a fixed point relative to the respective machining unit or the cutting tool, since the same position of the camera relative to the tool is thus always assumed.

The object to determine the respective position of at least of the cutting tool of the machining unit by means of a camera is achieved by a holding fixture, arranged in a fixed position The camera is connected to a display unit via a cable to transmit the relative position of the cutting tool to the display unit. The display unit displays the tool's position relative to the displayed cross section in the final state of the workpiece to be machined.

Due to the fixed holding fixture, the camera is always located in the same position relative to the machining station during each setting operation. In addition, the holding fixture may be designed in such a way that the camera can be positioned without further fastening or connecting elements. Since each machining unit is designed in such a way that it can be adjusted in a sensitive manner, at least an extremely accurate presetting of the cutting tool is made possible. After a test work piece has passed through the machining unit, only slight corrections are necessary, if at all.

In an especially simple manner, from the design point of view, provision is made for the holding fixture to be arranged in a fixed position relative to the machining unit. As a result, the same position is always assumed during the operation for setting the machining unit. The holding fixture is assigned to each machining unit. Thus, the camera can be put into the next machining unit, to be set, in the simplest manner after the setting operation. The camera is inserted into a holder which can be inserted into the holding fixture assigned to the respective machining unit.

Other objects, advantages and novel features of the present invention will become apparent from the following detailed description when considered in conjunction with the accompanying drawings.

BRIEF DESCRIPTION OF THE DRAWING

The invention is explained in more detail with reference to the attached drawing, in which:

the FIGURE shows a machining unit of a machine working according to the invention, in an elevation, but in simplified, representation.

DETAILED DESCRIPTION OF THE DRAWING

The machining unit 10, shown in the FIGURE, of a machine working according to the invention essentially comprises a rotationally drivable cutting tool 11 and a drive motor 12, to which electrical energy can be applied via a power supply cable in a manner not shown in any more detail. The drive motor 12 with the tool 11 can be set relative to a fixed machine frame and a conveying device for the workpieces in a known manner, which is not shown in detail. Since these mountings are known, they are not depicted for reasons of simplified representation. A machine contains a plurality of machining units 10 which are arranged in a row and through which the workpiece to be machined passes in succession.

Assigned to the machining unit 10 is a camera 13, the field of view of which is directed towards the cutting tool 11, as shown by the dot-dash lines. The camera 13, which may be a digital camera, is connected via a cable 14 to a display unit in the form of a notebook computer 15. As the FIGURE shows, the cross sections 16, 17 of two profiled workpieces appear in the exemplary embodiment. The workpieces, in the final state, are profiled at the longitudinal edges facing one another in such a way that they engage one inside the other in a positive-locking and/or frictional manner like a tongue and groove. The cross sections 16, 17 of the workpieces are transmitted in a manner known per se from drawing files to the screen of the notebook 15 and are displayed thereon. The position 11' of the tool 11 relative to the cross section 16 of the workpiece can be seen on the screen of the notebook 15. By varying the position of the drive motor 12 on its mounting and therefore also of the tool 11, the displayed position 11' relative to the cross section 16 also changes.

The digital camera 13 is a camera which has a cylindrical extension 18. This cylindrical extension 18 is inserted in a closing manner into a bore of a holder 19. On the side remote from the bore, the holder 19 is provided with two axially parallel bores, through which two cylindrical pins 20, 21 of a holding fixture 22 pass. The holding fixture 22 is arranged in a fixed position relative to the machining unit 10 that can be set. Thus, a single camera 13 with holder 19 may be easily mounted and removed from each machining unit 10 which requires setting The invention is not restricted to the exemplary embodiment shown. It is essential that at least the cutting tool 11 of the machining unit 10 is recorded by means of a camera, preferably a digital camera 13, and that the camera is connected to a display unit, preferably in the form of a notebook computer 15, via a cable 14. A cross section 16, 17 in the final state of at least one workpiece is transmitted to the screen of the notebook 15 from a drawing data bank. The image recorded by the camera 13 is likewise transmitted to the screen of the notebook 15, such that the machining unit 10 can be set relative to the cross section of a workpiece 16 appearing on the screen.

Although the present disclosure has been described and illustrated in detail, it is to be clearly understood that this is done by way of illustration and example only and is not to be taken by way of limitation. The scope of the present disclosure is to be limited only by the terms of the appended claims.

The invention claimed is:

1. A method of setting a machining unit, the machining unit having a respective cutting tool for machining workpieces made of wood, the machining occurring in regions of longitudinal and/or transverse edges of the workpieces to be machined, the method steps comprising:

arranging the workpieces to be machined such that they are transported in a continuous operation through the machining unit;

positioning a camera adjacent the respective cutting tool and recording and transmitting an image of a respective position at least of the respective cutting tool to a display unit; and displaying on the display unit a cross section of at least one of the workpieces to be machined in a final state of that workpiece such that the display unit is used as a gauge for positioning the respective cutting tool to machine the workpiece to be machined.

2. The method as claimed in claim 1, wherein the camera is a digital camera and wherein the display unit is a notebook computer, and the camera and the display unit are connected to one another via a cable which transmits signals.

3. The method as claimed in claim 1, wherein the camera is secured to a fixed point relative to the respective machining unit in order to set the cutting tool of the machining unit.

4. A machine for machining workpieces to be machined made of wood, the machining occurring in regions of longitudinal and/or transverse edges of the workpieces, the machine comprising:

a machining unit including a respective cutting tool and a drive motor;

a camera having a holding fixture mounted in a fixed position on the machining unit relative to the respective cutting tool;

the camera being connected to a display unit via a cable such that a respective position of the respective cutting tool is transmitted to the display unit; and the display unit displaying the respective cutting tool's position relative to a cross section of the workpieces in a final state of the workpieces to be machined.

5. The machine as claimed in claim 4, wherein the camera is always inserted in an identical position into a holder which is fixed relative to the holding fixture.

6. The machine as claimed in claim 4, wherein the holding fixture is arranged in a fixed position relative to the machining unit.

7. The machine as claimed in claim 4, wherein the camera is inserted into a holder, the holder being inserted into the holding fixture assigned to the respective machining unit.

* * * * *